(12) United States Patent
Xu et al.

(10) Patent No.: US 10,996,133 B2
(45) Date of Patent: May 4, 2021

(54) SEALING TIGHTNESS TESTING DEVICE

(71) Applicant: BAOYI GROUP CO. LTD., Wenzhou (CN)

(72) Inventors: Changxiang Xu, Guiyang (CN); Xiaozhong Zhang, Wenzhou (CN); Xiaoqiu Zhang, Wenzhou (CN)

(73) Assignee: BAOYI GROUP CO. LTD., Wenzhou (CN)

( * ) Notice: Subject to any disclaimer, the term of this patent is extended or adjusted under 35 U.S.C. 154(b) by 409 days.

(21) Appl. No.: 15/756,066

(22) PCT Filed: Jul. 26, 2016

(86) PCT No.: PCT/CN2016/091715
§ 371 (c)(1),
(2) Date: Feb. 28, 2018

(87) PCT Pub. No.: WO2017/036262
PCT Pub. Date: Mar. 9, 2017

(65) Prior Publication Data
US 2019/0025153 A1   Jan. 24, 2019

(30) Foreign Application Priority Data

Aug. 28, 2015   (CN) .......................... 201510561088.9

(51) Int. Cl.
*G01M 3/00*   (2006.01)
*G01M 3/32*   (2006.01)
(Continued)

(52) U.S. Cl.
CPC ............... *G01M 3/32* (2013.01); *B65D 90/50* (2013.01); *G01M 3/26* (2013.01); *G01M 3/3245* (2013.01)

(58) Field of Classification Search
CPC .................................. G01M 3/32; G01M 3/36
See application file for complete search history.

(56) References Cited

U.S. PATENT DOCUMENTS 5,078,006 A   1/1992   Maresca, Jr. et al.

FOREIGN PATENT DOCUMENTS

CN   2789747 Y   6/2006
CN   201837511 U   5/2011
(Continued)

OTHER PUBLICATIONS

Xu, Changxiang et al, "Pressure Energy, Leak Resistance, Fluid Resistance and Fluid Reactance of Fluid", Hydraulics Pneumatics & Seals, No. 09, Dec. 31, 2015, ISSN: 1008-0813, pp. 4-10.
(Continued)

*Primary Examiner* — Jamel E Williams
(74) *Attorney, Agent, or Firm* — Bayramoglu Law Offices LLC

(57) ABSTRACT

A tightness-gauging device and a meter for gauging a pressure's sustainability pt for a pressure vessel or system are provided. A pressure is produced against the test fluid inside a piston cylinder communicated with the tested vessel or system by a fixed-pressure supplying assembly including a weight, a piston, and a piston cylinder successively arranged coaxially and vertically. An equation $R_L=pt/C$ is used to represent the tightness of the pressure vessel or system. The equation $pt=p(p-0.5\Delta p)\Delta t/\Delta p$ is used in the meter for gauging the pressure's sustainability pt to express the pressure's sustainability, where p is the fixed test pressure, t is the elapsed time for the fluid to leak completely, C is the cubage of the pressure vessel or system, $\Delta p$ is the drop value of the pressure, and $\Delta t$ is the elapsed time for the pressure to descend from p to $(p-\Delta p)$ caused by the leakage.

21 Claims, 6 Drawing Sheets

(51) Int. Cl.
*G01M 3/26* (2006.01)
*B65D 90/50* (2019.01)

(56) References Cited

FOREIGN PATENT DOCUMENTS

| CN | 103439065 A | 12/2013 |
| CN | 203629754 U | 6/2014 |
| CN | 203745159 U | 7/2014 |

OTHER PUBLICATIONS

Xu, Changxiang; "Definition, Quantization and Determination of Tightness", Petro-Chemical Equipment, vol. 43, No. 3, May 31, 2014, ISSN: 1000-7466, pp. 11-14.

SEALING TIGHTNESS TESTING DEVICE

CROSS REFERENCE TO RELATED APPLICATIONS

This application is the national phase entry of International Application PCT/CN2016/091715, filed on Jul. 26, 2016, which is based upon and claims priority to Chinese Patent Application No. 201510561088.9, filed on Aug. 28, 2015, the entire contents of which are incorporated herein by reference.

TECHNICAL FIELD

The present invention relates to the technical field of fluid power-transmitting and medium-conveying systems, and further relates to impermeability test for the pressure vessels or systems. Particularly, the present invention relates to a device for gauging the tightness or the leak resistance (a quantity that is discovered and defined by the inventor) and a meter for gauging the pressure's sustainability (another quantity that is discovered and defined by the inventor), referred to as pressure's sustainability meter.

BACKGROUND

The unit of pressure $Pa=N/m^2=N \cdot m/m^3$=energy stored per unit cubage of fluid, or the energy stored in a static pressure vessel or system $E=pC$, where p=static pressure of fluid in the vessel or system, and C cubage of the vessel or system. Therefore, if the time for all fluid to leak out from the vessel or system at a fixed pressure p is t, then let leakage current $I_L=C/t$=the cubage of fluid passing through a sealing joint per unit time (or $C=tI_L$). With reference to the electrical resistance, let the leak resistance $R_L=p/I_L$=the ratio of pressure to leakage current. According to the equation $pC=ptI_L$, it can be known that $pC/I_L=pt \rightarrow CR_L=pt$ or $R_L$ $pt/C=p/I_L$. Apparently, the value of pt is also referred as a pressure-holding characteristic or the pressure's sustainability of a pressure vessel or system. Since the pressure vessel or system having a greater leak resistance is the one having a greater tightness, the leak resistance of a pressure vessel or system refers to its tightness. According to $R_L=pt/C$, the tightness or the leak resistance can be construed as the pressure's sustainability needed to cause the pressure vessel or system to leak a unit cubage of fluid. According to $R_L=p/I_L$, the tightness or the leak resistance can be construed as the pressure (energy) needed to cause the pressure vessel or system to leak a unit fluid current (or leak a unit cubage of fluid per unit time). Therefore, $CR_L=pt$ is called the pressure-holding equation (leaking equation) of a pressure vessel or system. This pressure-holding equation (leaking equation) is first discovered by the inventor of the present invention.

The cubage C and leak resistance $R_L$ of any normal pressure vessel or system are constant. Hence, the following can be derived on the basis of the leaking equation $CR_L=pt$.

1) The pressure's sustainability pt of any pressure vessel or system equals the product of cubage and leak resistance thereof, which is a constant, just as explained as the well-known facts tell, "the greater the cubage and leak resistance, the longer the time expended on leaking all of the pressure fluid under a fixed pressure; the higher the fixed pressure, the shorter the time expended on leaking all of the pressure fluid under the fixed pressure, and vice versa."

2) The leakage current of any pressure vessel or system is directly proportional to its pressure, and the ratio is its constant leak resistance, that is, the leak resistance $R_L$ $p/I_L$ $pt/C$=a constant, which is so definite as to say that the leaking equation of a pressure vessel or system exactly corresponds to the Ohm's law.

3) The unit of leak resistance can be $MPa \cdot h \cdot m^{-3}$. The unit of leak conductance, which is a reciprocal of the leak resistance, can be $m^3 \cdot (MPa \cdot h)^{-}$.

That is to say, the leaking equation is undoubtedly in full compliance with the objective laws of pressure-holding and leaking of a pressure vessel or system.

All the flows of fluids through a sealing joint, in a pipe or tube and on an object are an identical flow of fluids, at most having a different type and magnitude of resistance. Since a fluid pressure vessel or system has a leak resistance corresponding to the electrical resistance consuming energy, it should have a fluid reactance corresponding to the electrical reactance that does not consume energy, and a fluid impedance corresponding to the electrical impedance.

By comparison, the electronic mass is so tiny that an electrical current of electrons is a flowing body with kinetic energy negligible, and the molecular mass is so huge that a fluid current of molecules is a flowing body with kinetic energy not negligible. Therefore, the halting and flowing of electrons in an electric circuit manifest a mutual conversion of electrical pressure and electrical current between the two ends of the electric circuit, and the halting and flowing of molecules in a fluid circuit manifest a mutual conversion of the pressure energy and the kinetic energy between the two ends of the fluid circuit. Since the electrical reactance is an element causing the mutual conversion of electrical pressure and electrical current between the two ends of the electric circuit, the fluid reactance should be an element causing the mutual conversion of the pressure (energy) and the kinetic energy between the two ends of the fluid circuit.

Beyond all doubts, theoretically, the kinetic energy of the fluid results from its pressure doing work to its static body, or the kinetic energy of the fluid at a flowing state is $0.5mv^2=pAl \rightarrow 0.5\rho v^2=p$, where m=fluid mass, v=fluid velocity, $\rho=m/(Al)$=fluid density, and p pressure that did work to the static fluid (or the pressure that was used to give the kinetic energy to the fluid and does not exist in the fluid flowing at the said velocity), and l=the distance that a fluid cross-sectional area A moves under the action of force pA. Therefore, any fluid has a conversion from pressure to kinetic energy as the fluid is from rest state to flowing state, a conversion from kinetic energy to pressure as the fluid is from flowing state to rest state, and an unceasing mutual conversion between pressure and kinetic energy during the velocity-changing flowing of the fluid, always having a pressure decrement (increment) $\Delta p$ equal to a kinetic energy increment (decrement) $0.5\rho \Delta v^2$ in a unit cubage of fluid.

Since the unit of fluid velocity v is $[m/s]=[(m^3/m^2)/s]$, the fluid velocity v=the fluid cubage flowing through a unit cross-sectional area per unit time. Therefore, the fluid current $(I_F)$, whose definition is the fluid cubage flowing through a cross-section area (A) per unit time, equals the product of the cross-sectional area (A) and velocity (v), or the fluid current $I_F=Av$, which can be understood as the volume of a the fluid cross-sectional area A moving at a velocity v for a unit of time.

According to the equation that the kinetic energy per unit cubage of fluid=$0.5\rho v^2$=the pressure p for imparting the kinetic energy to the fluid, it can be known that, $$p = \rho v^2/2 \text{ (where } \rho = \text{fluid density, } v = \text{flow velocity)}$$

-continued $$= \rho A v^2 / 2A \text{ (where } A = \text{fluid cross-sectional area)}$$
$$= \rho I_F v / 2A \text{ (where } I_F = \text{fluid current} = Av)$$
$$= I_F X_F \text{ (where } X_F = \rho v / 2A = \rho I_F / 2A^2)$$

The quantity $X_F$, $X_F = p/I_F$, can have the same unit MPa·h·m$^{-3}$ as leak resistance and is a factor causing pressure (energy) to be converted into kinetic energy of fluid without any energy loss, therefore, with reference to electrical reactance, $X_F$ should be called fluid reactance of a fluid circuit, and $I_F X_F$ should be called the pressure drop caused by the fluid reactance.

Since the fluid reactance $X_F = (\rho v)/(2A)$ of a pipe is changed with the inner cross-sectional area A of the tube cavity, the pressure drop $I_F X_F$ (equal to the kinetic increment) caused by the fluid reactance of the pipe is leaped with the inner cross-sectional area A of the pipe in the flowing direction. In other words, the conversion from pressure to the kinetic energy caused by the fluid reactance is completed instantly, or the conversion from the pressure to kinetic energy results from the transient strike of the pressure on the fluid caused by the fluid reactance, or once the fluid flows, the strike pressure which causes the fluid to flow has been devoured by the fluid. Since another pressure for overcoming frictional resistance is further required for the flow of fluid, two pressure components in total are required when the fluid is flowing in the pipe, one is the pressure ($I_F X_F$) for imparting the flow to fluid, the other is the pressure ($I_F R_F$) for overcoming the flowed friction of fluid. That is to say, the total pressure drop of the fluid flowing in a pipe is $p = I_F R_F + I_F X_F = I_F (R_F + X_F)$, where $I_F R_F$ is the pressure caused by the fluid resistance, and $I_F X_F$ is the pressure that the fluid reactance causes the fluid to devour. Alternatively, it can be understood that any pipe line is a series fluid circuit consisting of a fluid resistance $R_F$ and a fluid reactance $X_F$, and $p = I_F (R_F + X_F)$ can be called the flow equation of fluids in the pipe.

In fact, there largely exists a frictional resistance between the contact surfaces of any two objects that have relative motions or relative motion tendencies to prevent them from moving relatively. Apparently, the frictional resistance that the pipes or tubes generate for the fluid flowing in them acts on the peripheral surface of the fluid current. In 1838, Poiseuille, a French physicist and biologist, proved that for the frictional resistance of a tube against fluid equals $(8\eta l)/(\pi r^4)$, or $R_F = (8\eta l)/(\pi r^4)$ (where, $\eta$=fluid viscosity, l=tube length, r=tube wall radius) by using a very thin tube. Not only the unit of the frictional resistance is not Newton, but also the frictional resistance $R_F$ equals the ratio of the fluid pressure p to the fluid current $I_F$ between two ends of the tube, or the resistance $R_F$ is a fluid resistance corresponding to the electrical resistance. Later, people named the discovery as Poiseuille's law which is successfully applied in the field of fluid flowing with extremely low flow velocity, such as the human hypertension therapy and fluid viscosity measurement. Because of not knowing before that a pipe or tube may have a fluid reactance causing a pressure drop, people mistakenly believed that the reason why the Poiseuille's law only accords with the fluid flowing in a capillary tube rather than in an ordinary pipe is that there is an uncertain pressure drop caused by the turbulence in the ordinary pipe. Therefore, until now, the physical parameters of the fluid resistance have not been formally defined and applied according to the Poiseuille's law.

In contrast to the peripheral resistance of pipe fluids, the reactance of pipe fluids that is leaped with the fluid cross-sectional area is the front resistance from bore-changing passages or ports of pipes to fluids. The resistance of fluids flowing through a sealing joint and the peripheral resistance and the front resistance of fluids flowing in pipes are identically a resistance of fluids flowing through fluid circuits, so they obviously have the same dimension. As the unit of the fluid resistance defined according to Poiseuille's law is also the same MPa·h·m$^{-3}$ means that it has been proved, the fluid leaking equation and fluid flow equation discovered by the inventor reach the same goal by different means and thus are scientific.

The wall-bulged passage of tube and moving object which are adjacent, have equivalent right (angle) inclusion volume and are coaxially formed by sharing a common generatrix, when moving relative to the fluid at the same velocity for every length of body, would cause the fluid whose cubage equals the right inclusion volume to be squeezed through between the same solid surface and static-pressure fluid, or cause the same fluid to flow through the internal and external fluid circuits with the same fluid resistance and reactance [See XU Chang-Xiang, ZHANG Xiao-Zhong, CHEN You-Jun. Pressure Energy, Leak Resistance, Fluid Resistance and Fluid Reactance of Fluid. Hydrodynamic Pneumatics and Seals, 2015, 35 (9)]. Thus, it is clear that the flow of the external fluids flowing on a moving object can be fully described according to the flowing equation of the internal fluid within a tube.

In conclusion, all flows of fluid can be described by the equation $p = I_F (R_F + X_F)$, where p is the total pressure required for the flow of fluids, $I_F$ is the fluid current, and $R_F$ is the peripheral or tangential resistance against the fluid current flowing past the conducting surface (called fluid resistance of fluid conductor to fluids), and $X_F$ is the front or axial resistance against the fluid current flowing past the obstructing surface (called fluid reactance of fluid obstacle to fluids). The fluid reactance of the windward surface (port) or the reducing passage (port) is the positive fluid reactance that causes some pressure energy to be converted into kinetic energy. The fluid reactance of the leeward surface (port) or the enlarging passage (port) is the negative fluid reactance that causes some kinetic energy be converted into to pressure energy. $I_F R_F$ is the irreversible pressure component caused by fluid resistance. $I_F X_F$ is the reversible pressure component of conversion between pressure energy and kinetic energy caused by fluid reactance. A flow of fluids flowing through the sealing joints and the capillaries is the flow with extremely small fluid velocity or fluid current quantity, and thus can be regarded as a flow only with fluid resistance but without fluid reactance. A flow of fluids flowing through the bore-changing passages or ports is a flow with extremely short flow distance, and thus can be regarded as a flow only with fluid reactance but without fluid resistance. A flow of fluids flowing through straight passages can be regarded as a flow only with fluid resistance but without fluid reactance. A flow of fluids flowing through ordinary pipe lines can be regarded as a flow with both fluid resistance and fluid reactance. Therefore, before not knowing the fluid resistance, fluid reactance, fluid impedance and fluid flowing equations of the fluid circuit, it is impossible to realize an effective control of the flow and leakage of fluid and have a safe and reliable fluid power-transmitting and medium-conveying system. That is to say, the existing hydromechanics and the existing ISO standard for the controlling of leakage before not knowing the effects of the fluid resistance, fluid reactance and flow impedance on the flow of fluids deviate from the science and are the root cause of vast accidents.

It is not difficult to observe that any flowing fluid always tries to bypass or avoid unshakeable front obstacles that the fluid current encounters in acceleration, while all the moving solid objects desperately impact the front obstacles that the objects encounter. These are the unique movement characteristics that fluid and solid respectively have. Since the static pressure of fluid is the only motive force that maintains a steady flow of fluid, when a fluid without constant shapes encounters front obstacles, it naturally would face a converging attack of the static pressure and the front resistance to speed up and cross flow; or the behavior that the fluid accelerates to avoid the front obstacle, as mentioned earlier, results from such impact of the pressure on the fluid as it is caused by the fluid reactance or the front resistance of the fluid. This is the mechanism by which the pressure of fluid decreases while the flow velocity increases. Therefore, the fact that existing hydromechanics has no idea of the mechanism or whys of "the pressure of fluid decreases while the flow velocity increases" (Bernoulli's principle) is enough to show that the existing hydromechanics has not yet touched on the substance of how the fluid flows, and how to effectively use and control the flow of fluid. Without these bases, how can we know the means to ensure the safety of the fluid power-transmitting and medium-conveying systems?

The fluid reactance determines whether the fluid flows in acceleration or deceleration, or determines how the fluid flows. However, to recognize the fluid reactance, based on the derivation process of fluid reactance described above, the leak resistance or fluid resistance of fluid must be recognized first. Therefore, the discovery or definition of leak resistance or fluid reactance of fluid is a necessary prerequisite for the discovery of fluid resistance. Originally, the leak resistance of the fluid $R_L$ p/$I_L$ corresponding to the electrical leak resistance refers to the pressure required to leak a unit cubage of fluid per unit time. The fluid leak conductance $1/R_L = I_L/p$ corresponding to electrical leak conductance or to the reciprocal of electrical resistance refers to the leaked fluid cubage caused by unit pressure per unit time, where $I_L$=leakage current of fluid=cubage of leaked fluid per unit time≠volume of decompression fluid leaked per unit time, p=fluid pressure during leakage. However, ISO 5208, "Industrial Valves—Pressure Testing of Industrial Metallic Valves" (GB/T 13927) has incorrectly defined the leakage current ($I_L$) as the leakage rate (leak conductance) and uses the leakage current to check the seal, which is tantamount to using reciprocal $1/I_L$ of leakage current ($I_L$) as the standard of tightness or leak resistance to check the seal, and is also tantamount to identifying the constant p/$I_L$ by the variable $1/I_L$. "ISO 19879 Metallic Tube Connections for Fluid Power and General Use—Test Methods for Hydraulic Fluid Power Connections" (GB/T 26143) specifies that a seal without visually detectable leakage under a fixed pressure for a test duration is a qualified seal, which is tantamount to specifying that any seal with visually detectable leakage beyond a specified test duration is also a qualified seal, and actually still to using the visually detectable volume of decompression fluid that leaks out of a pressure vessel for a specially specified unit of time to inspect seals. That is substantially the same as ISO 5208, which still identify the constant p/$I_L$ by the variable $1/I_L$. Although ISO 5208 and ISO 19879 identify the constant p/$I_L$ by the variable $1/I_L$ without considering the condition where the leakage current changes with the pressure, the seal is somewhat identified by the leakage current under a certain pressure in a certain period of time. However, "ISO/TR 11340 Rubber and Rubber Products Hydraulic Hose Assemblies External Leakage Classification for Hydraulic Systems" (GB/Z 18427) classifies leakage into six levels according to the size of visible leakage current completely, regardless of the value of pressure. Due to the difficulty of collecting and measuring leakage fluid, in order to identify the quality of the seal by naked eyes, ISO 5208 prescribes specific conversion regulations between the $mm^3$ volume of leakage per second and the number of leakage drops and bubbles per minute. When identifying the leakage of sealing by naked eyes, firstly the adhesivity and volatility of liquid and the negative-deviation test pressure both may result in no leakage drop existing within the pressure duration; secondly the water depth of observation and the and negative-deviation test pressure of the bubbles may get the result that no bubble exists within the pressure duration; then the standard for judging whether the pressure vessel meets the requirements of no visible leakage is too low, which may cause the products with poor quality to get into the service pipeline while the user cannot monitor and timely discover the leakage in the gas pipeline and narrow space, and in the underground and long-distance gas-liquid pipeline; eventually the leakage may inevitably be out of effective control, completely. So to speak, these standards fully prove that the existing sealing technology not only lacks scientific understanding of the tightness or leak resistance, but also lacks scientific understanding and measurement means for the misused physical quantity (leakage current). That is to say, the existing sealing technology not only has no idea about that the leakage current is directly proportional to the test pressure, but also has no idea about the differences between the cubage occupied by the leaked compressed fluid and the volume of leaked decompression fluid. Moreover, the existing sealing technology has no idea about the error caused by the loss of adhesion and volatility of the leaked fluid. Even worse, the existing sealing technology requires to measure the meaningless leakage current knowing that the seal has obvious leakage. Such requirement shows that the existing sealing technology not only does not have any scientific identification method and means for visible leakage, but also does not have any scientific identification method and means for invisible leakage. Therefore, the existing technical standards related to the seal not only make the leakage of a pressure vessel or system completely out of control, but also contribute to the ignorance of how the fluid flows in the field of hydromechanics in a long period of time, which inevitably causes tremendous accidents in fluid power-transmitting and medium-conveying systems.

SUMMARY

The objective of the present invention is to provide a device for gauging the tightness (or the leak resistance) and the pressure's sustainability (pressure-holding characteristic) discovered and defined by the inventor, and at least to turn people from only unscientifically identifying visible leakage by naked eyes of the pressure vessel and system into scientifically identifying the visible and invisible leakage by instruments, so as to make the uncontrollable leakages of pressure vessel and system become fully controllable by people. Since the pressure vessel or system having greater leak resistance is the one having a tighter connection, the tightness is the leak resistance. The inventor has proved that the cubage of fluid leaked from a pressure vessel or system per unit time or the leakage current $I_L$ is directly proportional to the fluid pressure p, and the ratio is the tightness or the leak resistance $R_L$, that is to say, the leak resistance of a pressure vessel or system $R_L=p/I_L$ which is a constant independent of the magnitude of the pressure p and the leakage current $I_L$. However, in the prior art, the volume of decompression fluid leaked to the outside of the vessel or system per unit time or the leakage current $I_L$ is incorrectly called the leakage rate (leak conductance) and used to identify whether the seal is good or not, which is at least tantamount to using a variable (the leakage current $I_L$ proportionally changing with the pressure p) to identify a constant (the ratio of pressure to leakage current). This action is worthless. In order to change the situation where the quality of the seal cannot be scientifically identified due to the unscientific definition of tightness or leak resistance in the prior art, a device for gauging the tightness or leak resistance for a pressure vessel or system is provided according to the tightness or the leak resistance discovered and defined by the inventor (see FIGS. 1-3), where the leak resistance $R_L=p/I_L=p\Delta t/\Delta C$, p is a fixed test pressure of the pressure vessel or system; $I_L=\Delta C/\Delta t$ is the cubage of the test fluid leaked out of the pressure vessel or system per unit time; the fixed test pressure p is created by an assembly in which a weight (06), a piston (05), and a piston cylinder (04) are successively arranged coaxially and vertically, and is applied to the test fluid in the piston cylinder that is connected to the pressure vessel or system to be tested; a ratio G/A of the total gravity G of the weight and the piston assembly to a cross-sectional area A of the piston cylinder is the fixed test pressure p; the product of a height $\Delta h$ of the weight and the leakage-caused piston descent and the cross-sectional area A of the piston cylinder is a the cubage of leaked test fluid $\Delta C$; $\Delta t$ is the elapsed time for the cubage $\Delta C$ of fluid to leak.

The leak resistance $R_L=p\Delta t/\Delta C$ is determined by three variables i.e. the test pressure p, the cubage $\Delta C$ of leaked fluid, and the elapsed time $\Delta t$ for leaking the cubage $\Delta C$ of fluid. The test pressure p is the ratio of the total gravity G applied to the test fluid to the cross-sectional area A of the piston cylinder G/A. The $\Delta C$ is the product $\Delta hA$ of the height $\Delta h$ of the leakage-caused piston descent and the cross-sectional area A of the piston cylinder. Therefore, to get the primary leak-resistance-gauging device, first, the fixed-pressure supplying assembly should be placed or fixed on a a level table (01) of a digital height gauge by means of a cylinder base (03b). The digital height gauge is used to test and indicate the height $\Delta h$ of the leakage-caused piston descent. A separate timer is used to record the elapsed time $\Delta t$ for the piston to descent by the height $\Delta h$. After the leakage reaches the specified value of $\Delta h$ or $\Delta t$ and the value of $\Delta t$ or $\Delta h$ is read, the leaked fluid cubage $\Delta C=\Delta hA$ and the leak resistance $R_L=p\Delta t/\Delta C$ are successively calculated according to the specified value of $\Delta h$ or $\Delta t$, the readout value of $\Delta t$ or $\Delta h$ and the known value A and p.

If the chip or microprocessor of the digital height gauge in the primary leak-resistance-gauging device is substituted by a microprocessor that has the functions described below such as data input, acquisition, operating and display and/or print (output), then a programmable leak-resistance-gauging instrument may be acquired, an input acquisition function for gravity G of the weight and the piston assembly and the cross-sectional area A of the piston cylinder;

a selection and input acquisition function for the height $\Delta h$ and the time $\Delta t$ of the piston which are used as specific values;

an acquisition function for the piston-descended height $\Delta h$ and time $\Delta t$ that can be reset by a switch or button;

a calculation function for calculating the test pressure p=G/A, the leaked fluid cubage $\Delta C=\Delta hA$ and the leak resistance $R_L=p\Delta t/\Delta C$ when the leakage reaches the specified value of $\Delta h$ or $\Delta t$; and a function for at least outputting, displaying and/or printing the value of leak resistance $R_L$.

Therefore, the primary leak-resistance-gauging device will become a programmable leak-resistance-gauging instrument after improved, wherein, the fixed-pressure supplying assembly is placed or fixed on a level table (01) of the programmable leak-resistance-gauging instrument through a cylinder base (03b). The programmable leak-resistance-gauging instrument can automatically calculate and at least display or/and print the leak resistance after automatically acquiring data of $\Delta C$ and $\Delta t$ of the leak resistance. Each gauging is performed under a specified or selected value of p until the leakage reaches a specified or selected value of $\Delta C$ or $\Delta t$.

The leak resistance gauging of some pressure vessels can be performed while the pressure vessel is directly placed on the level table (01) of the digital height gauge or a programmable leak-resistance-gauging instrument. Under this situation, the piston cylinder (04) of the fixed-pressure supplying assembly needs to be directly connected to the pressure vessel to be tested. However, some pressure vessels and systems cannot be placed on the level table (01) for leak resistance gauging. A cylinder base (03b) which allows a piston cylinder (04) to communicate with a hose assembly (03a) should be placed on the level table (01) so as to apply the test pressure to the pressure vessel or system to be tested. In order to satisfy the requirements of these two situations at the same time, generally, the piston cylinder (04) and the cylinder base (03b) are often made in two pieces. Obviously, the piston cylinder (04) and the cylinder base (03b) can be made in one-piece construction only for meeting the test requirements for the pressure vessel and system that are not placed on the level table (01).

Since the operation of the leak-resistance-gauging device is lengthy, it is merely applicable to the leak resistance determination of the seal-pressure vessel and system in finalized design while not applicable to the acceptance inspection and operation monitoring of the finalized pressure vessel and system. Since the cubage C and the leak resistance $R_L$ of the finalized pressure vessel and system are known or fixed, according to the leaking equation $CR_L=pt$, it can be known that whether the pressure's sustainability value pt is qualified or merely whether there is any change of the pressure's sustainability value pt needs to be checked for the acceptance inspection and operation monitoring of the seal of the finalized pressure vessel and system pressure's sustainability.

The leakage of any static-pressure vessel or system would cause a drop of pressure. Since the leakage that causes the pressure to drop from p to $(p-\Delta p)$ is equivalent to a leakage in which a sub-space having a cubage that is $\Delta p/p$ times of the total cubage is completely leaked under a pressure $(p-0.5\Delta p)$. Therefore, if the elapsed time for the pressure p to drop by $\Delta p$ is $\Delta t$, then the elapsed time for the complete leakage of the entire static-pressure vessel or system having $p/\Delta p$ sub-spaces in total under the pressure p is $(p/\Delta p)\Delta t$, or the pressure's sustainability of the entire static-pressure vessel or system is $pt=(p/\Delta p)(p-0.5\Delta p)\Delta t$. Obviously, the value of $p/\Delta p$ is higher, the observation time is shorter, the test is closer to the constant-temperature and constant-pressure test, so the test is more accurate, and it is more proper to replace $(p-0.5\Delta p)$ by p. This is the seal theorem discovered by the inventor. According to this theorem, as long as the elapsed time $\Delta t$ for the pressure of the static-pressure vessel and system leaking at any pressure p to drop by $\Delta p$ is known, the pressure's sustainability pt of the same can be known, even the leak resistance $R_L$ pt/C can be known.

All the digital pressure gauges with range of tens or even hundreds of megapascals (MPa) in the prior art can resolve pressure changes of 0.001 MPa. Therefore, once the acquisition circuit of the elapsed time $\Delta t$ for the pressure change $\Delta p$ and the calculation circuit of the pressure's sustainability $pt=p(p-0.5\Delta p)\Delta t/\Delta p$ are integrated into the pressure acquiring and identifying chip of the digital pressure gauges in the prior art, it can be used to detect the pressure's sustainability of any pressure vessel and system under any pressure. Therefore, a meter for gauging the pressure's sustainability pt of a pressure vessel or system is provided by the present invention, wherein, pt $p(p-0.5\Delta p)\Delta t/\Delta p$, where t is the elapsed time for a complete leakage of fluid inside a pressure vessel or system to be tested under a fixed pressure p; $\Delta t$ is the elapsed time for the pressure of the pressure vessel or system to drop from p to $(p-\Delta p)$ due to leakage; pt is automatically calculated and displayed after p, $\Delta p$, and $\Delta t$ are automatically collected; and each gauging is performed until the specified or selected value of $\Delta p$ or $\Delta t$ is reached by the leakage.

If two ends of isodiametric long-distance pipeline are each installed with a pressure's sustainability gauging meter, and the two ends of the segment of the pipeline or system are disconnected or the pressure source is removed under a working pressure to perform the pressure's sustainability test, when the displayed pressure's sustainability value pt of two gauging meters are equal to each other and is not less than a due value, it is supposed that the seal did not change, when the displayed pressure's sustainability value pt of two gauging meters are not equal to each other, it is supposed that there is a centralized leaking point which is closer to the gauging meter with lower value because the tested pipeline is a static-pressure pipeline and no fluid reactance but merely fluid resistance which is 0.5 times of the leakage current exists. According to Poiseuille's law, the leak resistance of both sides of the leaking point is directly proportional to the length of pipeline. In this way, the leaking point can be found without inspecting the pipeline with naked eyes.

In conclusion, with the seal test device of the present invention, people may break away from the history of the unscientific leakage test method that the number of drops of the leakage fluid per unit time and the number of bubbles, or the volume should be distinguished by naked eyes.

BRIEF DESCRIPTION OF THE DRAWINGS

In the drawings FIGS. 1-3 of the test device of the present invention, 01 is level table (surface), 02a, 02b and 02c are rectangular ring seals of final port, second port and first port for conducting the test pressure, respectively, 03a is hose assembly, 03b is cylinder base, 04 is piston cylinder, 05 is piston (assembly), 06 is weight, 07 is probe of height gauge, 08 refers to timer, 09 is safety support, 10 is overflow groove, 11 is rising ring, 12 is verifying vessel, 31 is bolt for fixing the cylinder base (03b).

2. Unit 60 is the Double Block-and-Bleed (DBB) Valve used to provide a test pressure from a pressure source for the pressure vessel or system to be tested by a turning on/off operation of the valve. According to American Petroleum Institute Standard API 6D and convention, the valve filled with black is in the closed position, and, the unfilled, in the open position.

3. Unit 61 is the pressure acquiring and identifying chip for digital pressure gauges.

4. Unit 62 is the pt-acquiring or detecting chip for a meter for gauging a pressure's sustainability pt, and formed by integrating an acquisition circuit of an elapased time $\Delta t$ for a pressure p of the pressure vessel or system to drop to a different pressure $(p-\Delta p)$ due to leakage and a calculation circuit of the pressure's sustainability $pt=p(p-0.5\Delta p)\Delta t/\Delta p$ into Unit 61.

5. Unit 63 using the pressure acquiring and identifying chip (Unit 61) is a digital pressure gauge, and, using the pt-acquiring or detecting chip (Unit 62), is a meter for gauging a pressure's sustainability pt.

DETAILED DESCRIPTION OF THE EMBODIMENTS

Figure 3:
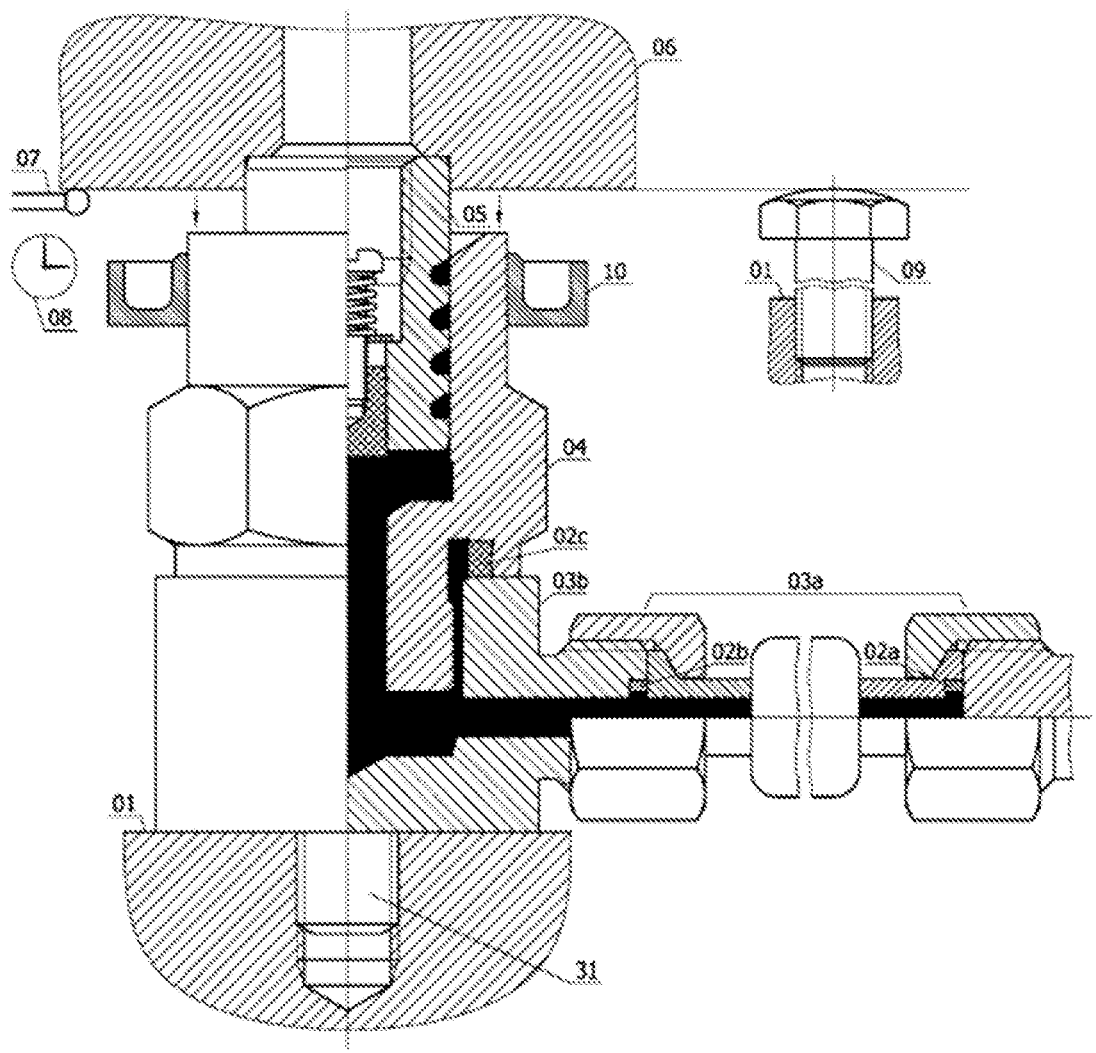
FIG. 3 is a device for gauging or verifying the total leak resistance of the test system including the pressure-conducting passage consisting of the hose assembly (03a) and the cylinder base (03b).

The seal of the common pressure vessels and the systems is to prevent the mutual seepage between the internal fluid and the external atmosphere. Any path that causes a mutual seepage is called leak circuit. Each leak circuit may have one seal or a series of seals. The total leak resistance of a leak circuit is the sum of the leak resistances of the serially connected sealing joints. The total leak resistance of a pressure vessel or system is the reciprocal of the total leak conductance. The total leak conductance is the sum of the leak conductance of each leak circuit, and the leak conductance of a leak circuit is the reciprocal of the total leak resistance. Therefore, in order to avoid the lengthy calculations of the intermediate leak conductance for determination of some leak resistance, as shown in FIG. 3, it should be ensured that the total leak resistance of the test system with multiple sealing joints (52) between the piston 05 and the piston cylinder 04 of the fixed-pressure supplying assembly and with three sealing joints 02a-02c in the test-pressure conducting passage is far greater than the leak resistance of the pressure vessel or system to be tested.

The means to ensure that the leak resistance of the sealing joint between the piston 05 and the piston cylinder 04 is large enough, first, is to use multiple O-ring seals to improve the total leak resistance, and then is to ensure that the liquid fully fills all the spaces between the O-rings of the piston 05 to make the O-rings work synchronously. Accordingly, some liquid should always be maintained in the port of the piston cylinder during the assembly operation of the piston 05.

The means to ensure that the leak resistances of the rectangular ring sealing joints 02a, 02b and 02c in the final, second and first ports of the test-pressure conducting passage are large enough, is to ensure the rectangular rings have a circumferentially uniform and full enough plastic deformation on the sealing contact surface and a circumferentially uniform and full enough elastic deformations in the rectangular ring body, so that the sealing stress is absolutely greater than the test pressure. The metal rectangular ring without cold flow can be used in repeated tests. The polytetrafluoroethylene rectangular ring with cold flow is for disposable use and should be immediately used after the installation, so as to avoid the fading of the elastic deformation of the rectangular rings due to cold flow, and thus cause the sealing stress to be unable to be absolutely greater than the test pressure.

Figure 1:
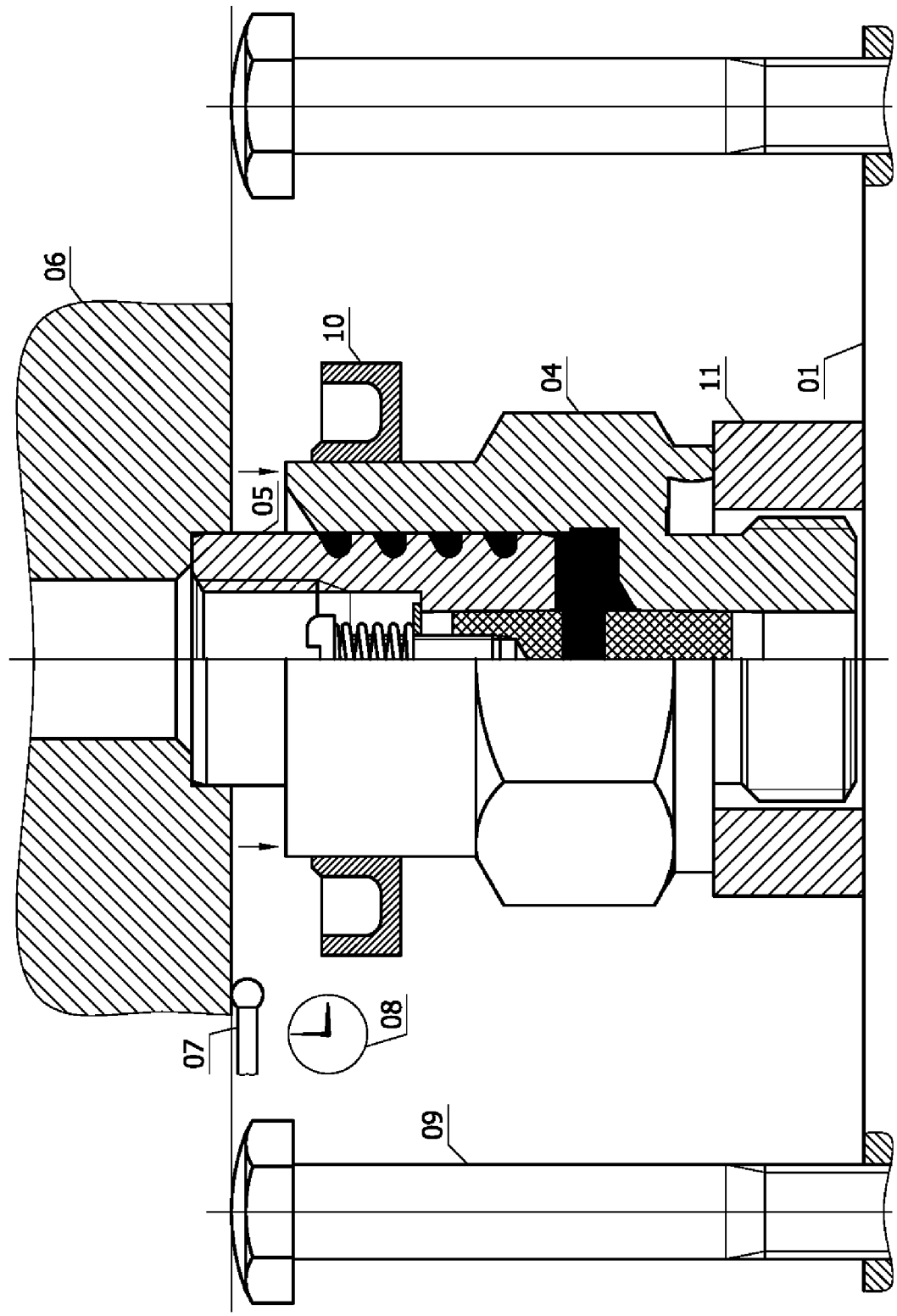
FIG. 1 is a device for gauging or verifying the leak resistance of the connection of the piston (05) and the piston cylinder (04), wherein 05 (piston assembly) is shown in FIG. 4.
Figure 2:
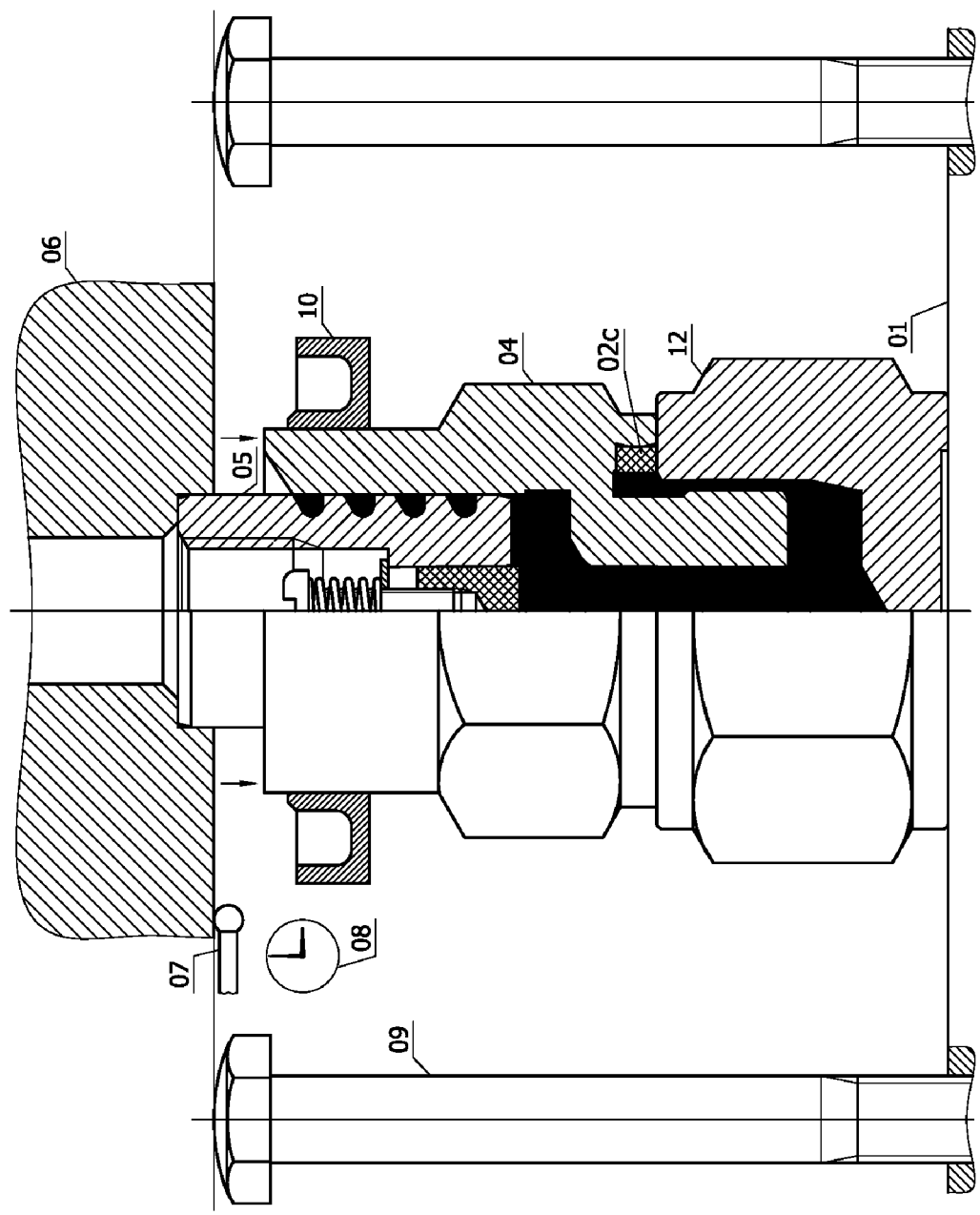
FIG. 2 is a device for gauging or verifying the total leak resistance of the test system only including the connection of the first pressure-conducting port (02c) at the piston cylinder (04).

However, whether the leak resistance of a test system is greater or smaller than the leak resistance of the pressure vessel or system to be tested should be proved only by gauging or verifying the leak resistance of the test system. FIG. 1 shows a device for gauging or verifying the leak resistance of the connection of piston (05) and piston cylinder (04). FIG. 2 shows a device for gauging and verifying the total leak resistance of the test system only including the connection of the first pressure-conducting port (02c) at the piston cylinder (04). FIG. 3 shows a device for gauging or verifying the total leak resistance of the test system including the pressure-conducting passage consisting of the hose assembly (03a) and the cylinder base (03b). Actually, expect for the large-scale pressure system having many leak circuits, the leak resistance of a common pressure vessels or systems is impossible to be much smaller than the leak resistance of the test system of a tightness-gauging device, and a calculation of intermediate leak conductance is inevitable. Therefore, the leak resistance of the test system of the tightness-gauging device must be stable and reliable, and can stand up to verification or reexamination.

Figure 4:
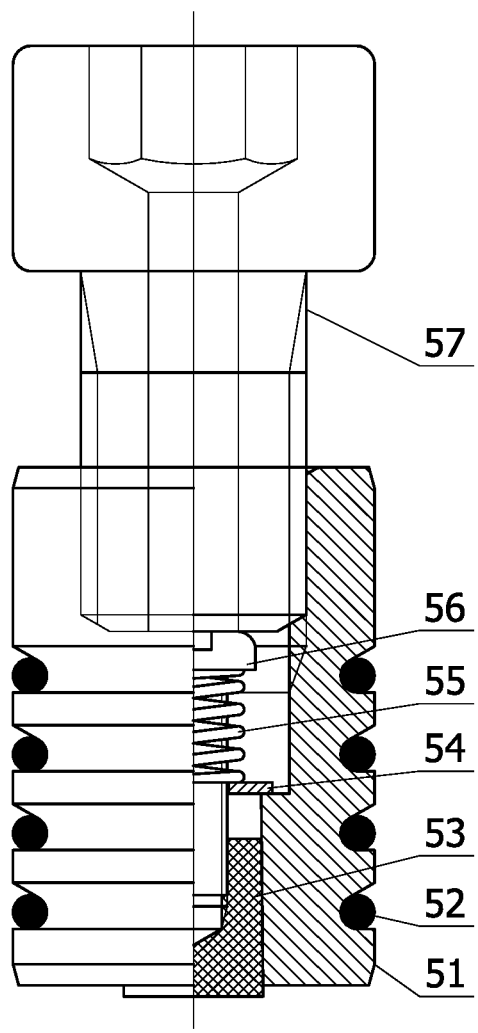
FIG. 4 shows the piston assembly (05), wherein 51 is the piston body, 52 is the O-ring sealing, 53 is the tapered plug for closing air vent tight, 54 is the thrust washer of the spring (55), 55 is the spring for resetting the tapered plug (53), 56 is the screw for resetting the tapered plug (53), 57 is the bolt for installing the piston assembly (05) into the cylinder (04).

An illusion of leakage may appear due to the compressibility of air in a pressure system where liquid is used as the test fluid, and such phenomenon would affect stability and reliability of the test. To ensure that the air is fully eliminated from the pressure system, it is preferred to place the test pressure supplying cylinder where the cylinder port is situated at the highest point of the pressure system to be tested, and install the piston 05 into the cylinder 04 after the test fluid is slowly poured up to the cylinder port. To ensure that the piston 05 can be successfully installed into the cylinder fully filled with the test fluid, as shown in FIG. 4, before the assembly operation, the bolt 57 should be used to push and press against the screw 56 to push the tapered plug 53 in the central vent of the piston 05 away from the sealing contact position, so that the compressed test fluid can be vented directly to the atmosphere. When the most upper O-ring is just mounted into the cylinder wall of the cylinder, the bolt 57 is removed so that the tapered plug 53 is automatically wedged into the tapered vent by the reset structure formed by the washer 54, the spring 55 and the screw 56. To ensure that the leak resistance of the vent is infinite, the tapered plug 53 should be made of polytetrafluoroethylene or metal coated with soft metal or polytetrafluoroethylene. In order to avoid an illusion of leakage caused by the wedge motion of the tapered plug 53, the tapered plug and the tapered vent should have an enough engaging length.

Figure 5:
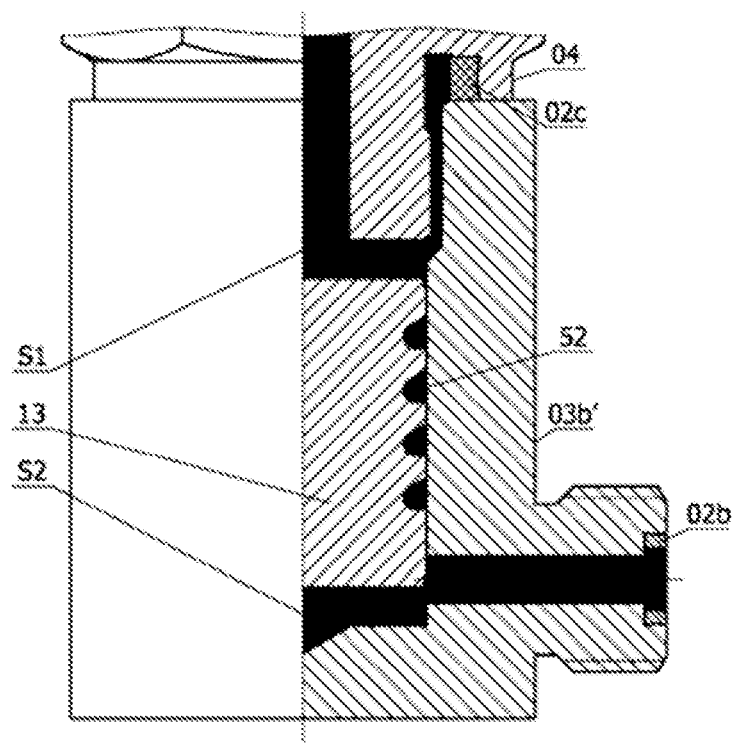
FIG. 5 is a partial view of FIG. 3 where the cylinder base 03b in FIG. 3 is replaced by the cylinder base 03b' having with the isolating piston 13.
Figure 6:
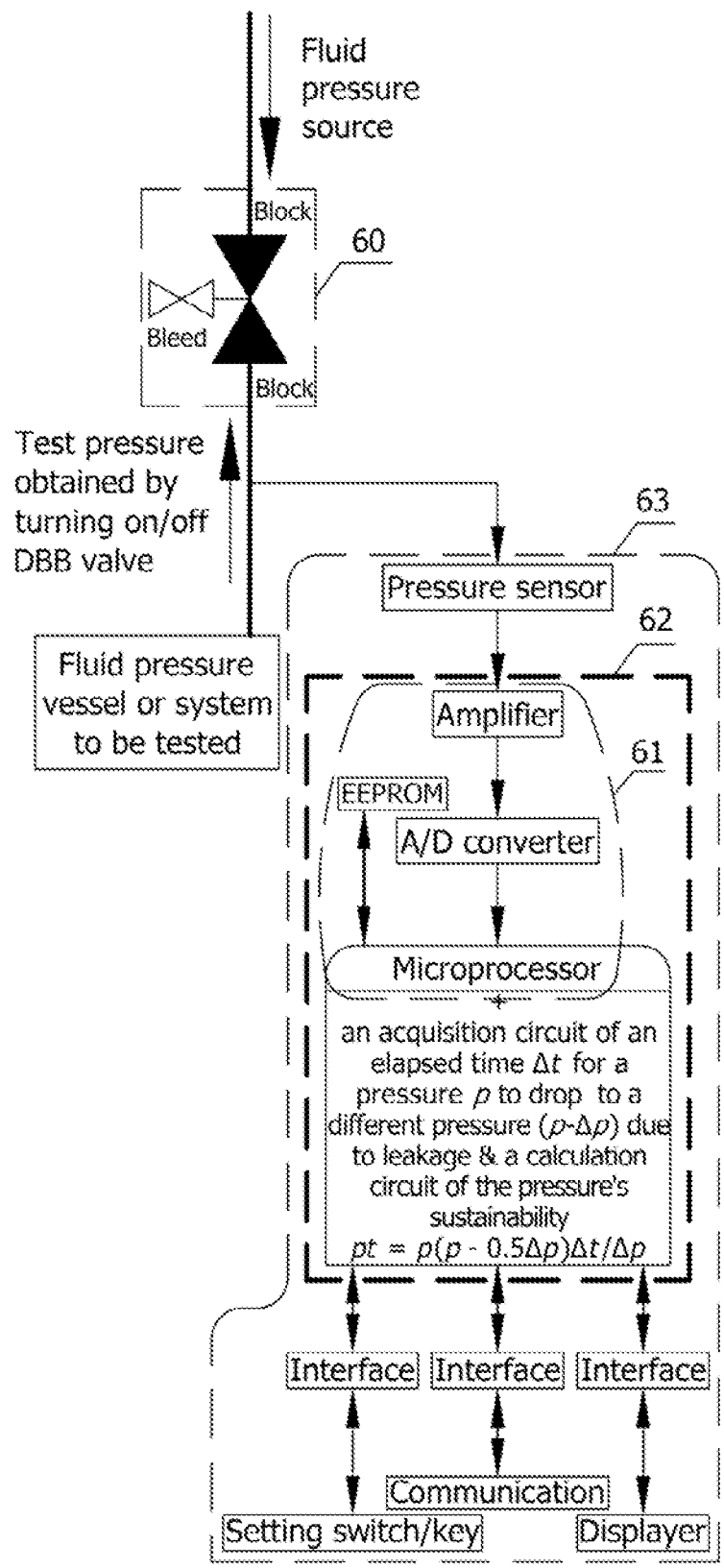
FIG. 6 is a schematic illustration of a meter for gauging a pressure's sustainability pt of the invention shown connected to the double block-and-bleed valve, in which 1. EEPROM=Electrically Erasable Programmable read only memory.

When it is inconvenient to place the test pressure supplying cylinder where the cylinder port is situated at the highest point of the pressure system to fill the test fluid, if an isolating piston is added to the pressure-conducting passage of the tightness-gauging device, the test system and the pressure system to be tested may be respectively filled with the same or different fluids. When the existing pressure fluid of the pressure system to be tested is used to test the leak resistance, an isolating piston should also be added in the pressure-conducting passage of the tightness-gauging device to facilitate gauging the leak resistance. After the isolating piston 13 is added to the cylinder base 03b in FIG. 3, the cylinder base shown in FIG. 3 will become the cylinder base 03b' in FIG. 5 with two natural faces S1 and S2 that may cause the isolating piston 13 to separately withstand two unidirectional pressures. Thus, when the fluid in the pressure system to be tested is pressurized up to an appropriate pressure and thus pushes the isolating piston against the upper limit face, after the test fluid is fully filled into the test pressure supplying cylinder and the piston 5 is mounted into the test pressure supplying cylinder according to the foregoing method, the weight 6 can be added to commence the leak resistance test. The leak resistance of the isolating piston only affects the sustainability of the single unilateral pressure of the isolating piston, and does not affect the leak resistance test to be performed.

The compressed air under a constant pressure and a constant temperature has no change in volume. Therefore, under a fixed test pressure, as long as the test pressure supplying piston has an enough trip that meets the requirement of leakage test, the air may also be used as the test pressure supplying fluid, so as to make the test become very convenient. When the air is used as the test pressure supplying fluid, the liquid may be poured between the O-ring seals of the test pressure supplying piston 05 to make the O-ring seals deform and function at the same time. When liquid overflows during the installation of the test pressure supplying piston 05, an overflow groove 10 should be attached to the outer surface of the piston cylinder 04 and even a drain should be attached to the bottom of the overflow groove.

The leak resistance and its calculation formula of standard seals can be determined by using the tightness-gauging device, and the leak resistance $R_L$ of the pressure vessel or system can be calculated according to the used standard seals and their series and parallel relations. Therefore, on the basis that the leak resistance $R_L$, pressure's sustainability pt and cubage C of the pressure vessel or system are respectively determined by using the tightness-gauging device, the pressure's sustainability gauging meter and some other measurement apparatus, with reference to the theoretical calculation value, the really gauged value and the formula $CR_L$=pt, the rated cubage C, the minimum leak resistance $R_L$ and the minimum pressure's sustainability pt of the pressure vessel or system can be determined. For the finalized pressure vessels or systems with known cubage C, leak resistance $R_L$ and pressure's sustainability pt, merely the pressure's sustainability gauging meter is required to test whether the pressure's sustainability values pt are qualified or decayed in the acceptance inspection and operation monitoring.

When the pressure's sustainability gauging meter is used to test the pressure's sustainability value of a pressure vessel or system, a double block-and-bleed valve (DBB valve) should be used. The DBB valve in the closed position allows its central cavity to vent to the atmosphere after both blocking flow from two left and right pressure vessels or systems. Therefore, the use of the opening position of the block-and-bleed valve allows the pressure vessel or system to connect the pressure fluid or pressure source to obtain the test pressure. The closed position of the double block-and-bleed valve is used to implement the pressure's sustainability test for the pressure vessel or system. Nevertheless, it is necessary to note that the DBB valve in the closed position is a leaking path of the being tested pressure vessel or system.

What is claimed is:

1. A tightness-gauging device for a pressure vessel or system comprising:
    a fixed-pressure supplying assembly comprising a weight, a piston, and a piston cylinder;
    wherein the weight, the piston, and the piston cylinder are successively arranged coaxially and vertically to produce a fixed test pressure p against test fluid inside the piston cylinder communicated with a vessel or system to be tested;
    wherein tightness is gauged by gauging a leak resistance; the leak resistance $R_L = p/I_L = p\Delta t/\Delta C$, p is the fixed test pressure of the pressure vessel or system, $I_L = \Delta C/\Delta t$ is a cubage of a test fluid leaked from the pressure vessel or system per unit time;
    a ratio G/A of a total gravity G of an assembly of the weight and the piston to a cross-sectional area A of the piston cylinder is the fixed test pressure p; a product $\Delta hA$ of a height $\Delta h$ of the leakage-caused piston descent and the cross-sectional area A of the piston cylinder is a cubage $\Delta C$ of leaked test fluid; and
    $\Delta t$ is an elapsed time for the cubage $\Delta C$ of fluid to leak.

2. The tightness-gauging device for the pressure vessel or system according to claim 1, wherein
    the fixed-pressure supplying assembly is placed or fixed on a level table of a digital height gauge through a cylinder base; the digital height gauge is used to gauge and display the height $\Delta h$ of the leakage-caused piston descent; and
    a separate timer is used to record the elapsed time $\Delta t$ for the cubage $\Delta C$ of fluid to leak.

3. The tightness-gauging device for the pressure vessel or system according to claim 1, wherein the fixed-pressure supplying assembly is placed or fixed on a level table of a programmable leak-resistance-gauging instrument through a cylinder base, wherein the programmable leak-resistance-gauging instrument is configured to automatically calculate and at least display and print the leak resistance after automatically acquiring data of $\Delta C$ and $\Delta t$ of the leak resistance; and
    each gauging is performed under a specified or selected value of p until the leakage reaches a specified or selected value of $\Delta C$ or $\Delta t$.

4. The tightness-gauging device for the pressure vessel or system according to claim 2, wherein
    the piston cylinder and the cylinder base of the fixed-pressure supplying assembly are one-piece construction.

5. The tightness-gauging device for the pressure vessel or system according to claim 1, wherein
    an isolating piston and cylinder assembly is provided in a passage of the test fluid flowing to the pressure vessel or system to be tested, and used to isolate the test fluid from fluid in the pressure vessel or system to be tested.

6. The tightness-gauging device for the pressure vessel or system according to claim 1, wherein
    more than one seal ring is disposed between the piston and the piston cylinder of the fixed-pressure supplying assembly.

7. The tightness-gauging device for the pressure vessel or system according to claim 1, wherein
    an overflow groove is attached to an outer surface of the piston cylinder of the fixed-pressure supplying assembly.

8. The tightness-gauging device for the pressure vessel or system according to claim 1 further comprises
    at least three safety supports used to protect the weight from collapsing.

9. A meter for gauging a pressure's sustainability pt of a pressure vessel or system developed from a prior digital pressure gauge by integrating an acquisition circuit of an elapsed time $\Delta t$ for a pressure p of the pressure vessel or system to drop to a different pressure $(p-\Delta p)$ due to leakage and a calculation circuit of the pressure's sustainability $pt = p(p-0.5\Delta p)\Delta t/\Delta p$ into a pressure acquiring and identifying chip of the prior digital pressure gauge, wherein
    t is an elapsed time for entire cubage of fluid in the pressure vessel or system to fully leak out under a fixed test pressure p relative to the atmosphere;
    each test is performed until the leakage reaches a specified or selected value of $\Delta p$ or $\Delta t$.

10. The meter according to claim 9, wherein
    the value of pt is calculated according to $(p-0.5\Delta p) = p$.

11. The tightness-gauging device for the pressure vessel or system according to claim 3, wherein
    the piston cylinder and the cylinder base of the fixed-pressure supplying assembly are one-piece construction.

12. The tightness-gauging device for the pressure vessel or system according to claim 2, wherein
    an isolating piston and cylinder assembly is provided in a passage of the test fluid flowing to the pressure vessel or system to be tested, and used to isolate the test fluid from fluid in the pressure vessel or system to be tested.

13. The tightness-gauging device for the pressure vessel or system according to claim 3, wherein
    an isolating piston and cylinder assembly is provided in a passage of the test fluid flowing to the pressure vessel or system to be tested, and used to isolate the test fluid from fluid in the pressure vessel or system to be tested.

14. The tightness-gauging device for the pressure vessel or system according to claim 4, wherein
    an isolating piston and cylinder assembly is provided in a passage of the test fluid flowing to the pressure vessel or system to be tested, and used to isolate the test fluid from fluid in the pressure vessel or system to be tested.

15. The tightness-gauging device for the pressure vessel or system according to claim 2, wherein
    more than one seal ring is disposed between the piston and the piston cylinder of the fixed-pressure supplying assembly.

16. The tightness-gauging device for the pressure vessel or system according to claim 3, wherein
    more than one seal ring is disposed between the piston and the piston cylinder of the fixed-pressure supplying assembly.

17. The tightness-gauging device for the pressure vessel or system according to claim 4, wherein
    more than one seal ring is disposed between the piston and the piston cylinder of the fixed-pressure supplying assembly.

18. The tightness-gauging device for the pressure vessel or system according to claim 5, wherein
more than one seal ring is disposed between the piston and the piston cylinder of the fixed-pressure supplying assembly.

19. The tightness-gauging device for the pressure vessel or system according to claim 2, wherein
an overflow groove is attached to an outer surface of the piston cylinder of the fixed-pressure supplying assembly.

20. The tightness-gauging device for the pressure vessel or system according to claim 4, wherein
an overflow groove is attached to an outer surface of the piston cylinder of the fixed-pressure supplying assembly.

21. The meter according to claim 9, wherein the fixed test pressure p relative to the atmosphere is obtained from the upstream end of a Double Block-and-Bleed valve (DBB valve).

* * * * *